United States Patent [19]

Smets et al.

[11] 4,064,078

[45] Dec. 20, 1977

[54] PROCESS FOR THE MANUFACTURE OF CARBOXYLATED POLYETHYLENIMINES

[75] Inventors: Georges Joseph Smets, Heverlee; Jacques Marie Van De Putte, Leuven, both of Belgium

[73] Assignee: Agfa-Gevaert, N.V., Mortsel, Belgium

[21] Appl. No.: 311,159

[22] Filed: Dec. 1, 1972

[30] Foreign Application Priority Data

Dec. 6, 1971 United Kingdom .............. 56450/71

[51] Int. Cl.$^2$ ............................................. C08G 73/04
[52] U.S. Cl. ............................... 260/2 EN; 260/239 E
[58] Field of Search ........................ 260/2 EN, 239 E

[56] References Cited

U.S. PATENT DOCUMENTS

| 2,943,092 | 6/1960 | Smrt et al. ........................ 260/239 E |
| 2,958,691 | 11/1960 | Smrt et al. ........................ 260/239 E |
| 3,650,963 | 3/1972 | Werdehausen et al. ........... 260/2 EN |

Primary Examiner—Wilbert J. Briggs, Sr.

Attorney, Agent, or Firm—A. W. Breiner

[57] ABSTRACT

Carboxylated polyethylenimines are prepared by dissolving in an inert solvent a compound of formula:

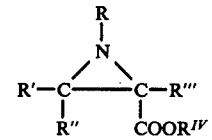

wherein:
R represents an alkyl or an aryl group,
each of R', R", and R''' represents hydrogen or methyl, and
R$^{IV}$ represents an alkyl group.

The solution is then treated between $-30°$ and $25°$ C with a polymerization initiator. After hydrolysis the polymer yields a polyamino acid which is an amphoteric product. They may be added as plasticizers to gelatin in photographic layers.

9 Claims, No Drawings

PROCESS FOR THE MANUFACTURE OF CARBOXYLATED POLYETHYLENIMINES

The invention relates to a process for the manufacture of carboxylated polyethylenimines and to the carboxylated polyethylenimines thus prepared.

According to the present invention a process is provided for the manufacture of carboxylated polyethylenimines, in which process a compound, dissolved in an inert solvent is treated with a polymerisation initiator at a temperature between −30° and 25° C, said compound corresponding to the general formula:

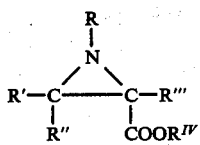

wherein:
R represents an alkyl group of 1 to 4 carbon atoms or an aryl group,
each of R', R'', and R''' (same or different) represents hydrogen or methyl, and
$R^{IV}$ represents an alkyl group of 1 to 4 carbon atoms.

Although the presence of oxygen does not inhibit the polymerisation reaction, it is nevertheless preferable to remove oxygen from the solution by bubbling an inert gas such as dry oxygen-free argon therethrough.

Lewis acids and/or strong proton donors such as aluminum chloride, sulphuric acid, dimethyl sulfate, trifluoroacetic acid, and borontrifluoride-diethyl ether can be added as polymerisation initiator to the solution.

The carboxylated ethylenimine monomer can be prepared by addition of bromine to an acrylic or methacrylic ester followed by the reaction of the brominated ester with a primary amine. In view of the addition polymerisation reaction the carboxylated ethylenimine monomer is dissolved in a solvent having a high dielectric constant e.g. nitromethane or acetonitrile, but which solvent is not a proton-donor.

The polymer formed is highly soluble in acetone, dimethyl ether, benzene and chloroform, it is soluble in nitromethane and insoluble in water. A solution of the polymer in acetone can be dispersed in water.

By the process of the invention and after filtration and washing with water, a carboxylated polyethylenimine is obtained, which by hydrolysis or saponification yields a polyamino acid. This polyamino acid is soluble in water, methanol and in most polar solvents. It is insoluble in ether, acetone and benzene.

The carboxylated polyethylenimines of the invention are composed of recurring units corresponding to the general formula:

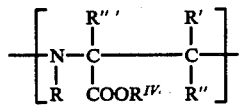

wherein R, R', R'', R''' and $R^{IV}$ have the same significance as indicated above. They are amphoteric products, i.e. they have both acidic and basic properties.

They may be dispersed in a suitable solvent and coated on supports to form films or sheets. Because of their sensitivity to water they may be added as plasticizers to gelatin in photographic layers such as backing layers, overcoatings, in the preparation of photographic silver halide emulsion layers, in subbing layers, etc. They may be used as sizing agents for papers, and textiles.

EXAMPLES 1–5

Polymerisation of 1-isopropyl-2-methoxycarbonyl-ethylenimine

Nitromethane was used as the solvent for the monomer. This nitromethane had been previously dried for 24 hours above magnesium perchlorate and was distilled under high vacuum, 14.3 g of 1-isopropyl-2-methoxycarbonyl-ethylenimine was dissolved in 100 ml of nitromethane and oxygen was eliminated from the solution by bubbling previously and during the whole reaction oxygen-free argon therethrough. While stirring for three days the temperature of the solution was kept at about 0° C. As initiator boron trifluoridediethyl ether was added in a concentration as indicated below.

To isolate the polymer after reaction the nitromethane was distilled off. The polymer was then dissolved in acetone and precipitated twice in distilled water. The molecular weight of the polymer was determined by osmosis in chloroform.

The following results were obtained.

| Example | Concentration of catalyst % | % by weight of isolated polymer | molecular weight | average number of units in polymer |
|---|---|---|---|---|
| 1 | 1 | — | — | — |
| 2 | 2 | 15 | 14,000 | 100 |
| 3 | 5 | 80 | 24,400 | 170 |
| 4 | 10 | 80 | 23,100 | 160 |
| 5 | 20 | 45 | 21,000 | 150 |

EXAMPLES 6–10

The process of Examples 1–5 was repeated with the difference, however, that instead of the boron trifluoridediethyl ether, dimethylsulphate was used as catalyst.

The following results were obtained.

| Example | Concentration of catalyst in % | % by weight of isolated polymer | molcular weight | average number of units in polymer |
|---|---|---|---|---|
| 6 | 1 | 75 | 8,700 | 60 |
| 7 | 2 | 70 | 7,400 | 50 |
| 8 | 5 | 25 | 6,700 | 45 |
| 9 | 10 | 45 | 4,800 | 35 |
| 10 | 20 | 20 | 4,800 | 35 |

The poly-1-isopropyl-2-methoxycarbonyl-ethylenimine was a yellowish-white powder melting at 115°–118° C.

The carboxylated polyethylenimine formed in the above Examples was composed of recurring units of the following formula:

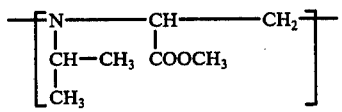

Alkaline hydrolysis of 1 g of poly-1-isopropyl-2-methoxycarbonyl-ethylenimine (molecular weight of 5000) in a mixture of 90 ml of ethanol and 10 ml of water, with 5 equivalent amounts of potassium hydroxide, yielded a precipitate after 1 hour of refluxing at 80° C. Ethanol was distilled and 100 ml of water was added. The precipitate was soluble in water. After 4 hours of refluxing at 100° C this product was treated with an anion exchange resin and rinsed with water. A product of hydrolysis was obtained, whose infrared spectrum showed two broad carboxyl bands at 1620 $cm^{-1}$ and 3000–2600 $cm^{-1}$. The molecular weight was lowered to 3000.

The alkaline hydrolysis of 1 g of poly-1-isopropyl-2-methoxycarbonyl-ethylenimine (molecular weight of 15,000) was repeated at room temperature during 1 month. After two to three weeks, ethanol was distilled under high vacuum without heating, and water was added. The infrared spectrum showed the same bands, but there was no degradation. The resulting polyampholyte was a white powder melting at 175°–177° C.

EXAMPLES 11–15

Polymerisation of 1-butyl-2-methoxycarbonyl-3-methylethylenimine

The processes of examples 1–5 were repeated with the difference, however, that instead of 1-isopropyl-2-methoxycarbonyl-ethylenimine, 3.4 g of 1-butyl-2-methoxycarbonyl-3-methyl-ethylenimine were used.

The following results were obtained.

| Ex. | Catalyst | Concentration of catalyst in % by weight | % by weight of isolated polymer | molecular weight | average number of units in polymer |
|---|---|---|---|---|---|
| 11 | $BF_3OEt_2$ | 2 | 32 | 2600 | 15 |
| 12 | $BF_3OEt_2$ | 3 | 32 | 2600 | 15 |
| 13 | $(CH_3)_2SO_4$ | 2 | 30 | 3000 | 18 |
| 14 | $(CH_3)_2SO_4$ | 3 | 38 | 1800 | 11 |
| 15 | $(CH_3)_2SO_4$ | 5 | 30 | 2300 | 13 |

The carboxylated polyethylenimine formed was composed of recurring units of the following formula.

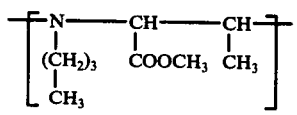

We claim:

1. Process for the manufacture of carboxylated polyethylenimines, which comprises treating a compound dissolved in an inert solvent with a polymerization initiator selected from the group consisting of Lewis acids and strong proton donors at a temperature between −30° and 25° C, said compound corresponding to the general formula:

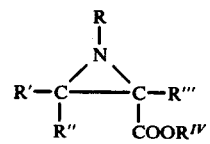

wherein:
R represents an alkyl group of 1 to 4 carbon atoms of an aryl group,
each of R', R", R''' represents hydrogen or methyl, and $R^{IV}$ represents an alkyl group of 1 to 4 carbon atoms.

2. Process according to claim 1, wherein the compound is 1-isopropyl-2-methoxy-carbonyl-ethylenimine.

3. Process according to claim 1, wherein the compound is 1-butyl-2-methoxy-carbonyl-3-methyl-ethylenimine.

4. Process according to claim 1, wherein the polymerisation initiator is boron trifluoride-diethyl ether or dimethyl sulfate.

5. Process according to claim 1, wherein the inert solvent is nitromethane or acetonitrile.

6. Carboxylated polyethylenimines composed of recurring units of the general formula:

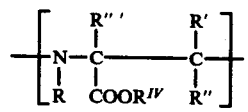

wherein:
R represents an alkyl group of 1 to 4 carbon atoms or an aryl group,
each of R', R", R''' represents hydrogen or methyl, and $R^{IV}$ represents an alkyl group of 1 to 4 carbon atoms.

7. Process according to claim 1 wherein the polymerization initiator is selected from the group consisting of aluminium chloride, sulphuric acid, dimethyl sulphate, trifluoroacetic acid, and borontrifluoride-diethyl ether.

8. The carboxylated polyethylenimines wherein the recurring units have the formula

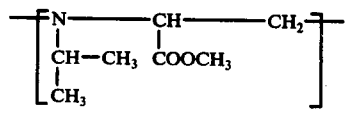

9. The carboxylated polyethylenimines wherein the recurring units have the formula

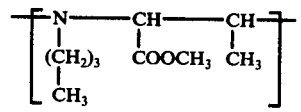

* * * * *